(12) United States Patent
Herb et al.

(10) Patent No.: US 7,203,225 B2
(45) Date of Patent: Apr. 10, 2007

(54) METHOD OF PHASE CONTROLLING OF A DATA SIGNAL, COUNTER CLOCK CIRCUIT ARRANGEMENT, AND INTERFACE DEVICE

(75) Inventors: Andreas Herb, Leonberg (DE); Martin Mittrich, Neuhausen (DE)

(73) Assignee: Alcatel, Paris (FR)

( * ) Notice: Subject to any disclaimer, the term of this patent is extended or adjusted under 35 U.S.C. 154(b) by 788 days.

(21) Appl. No.: 10/422,946

(22) Filed: Apr. 25, 2003

(65) Prior Publication Data

US 2003/0206606 A1 Nov. 6, 2003

(30) Foreign Application Priority Data

May 2, 2002 (EP) .................................. 02360143

(51) Int. Cl.
*H04B 1/38* (2006.01)
*H04B 3/46* (2006.01)
*H04B 17/00* (2006.01)
*H04L 5/16* (2006.01)
*H04L 7/00* (2006.01)
*H03D 1/24* (2006.01)

(52) U.S. Cl. ...................... 375/221; 375/321; 375/226; 375/356; 375/358

(58) Field of Classification Search ................ 375/221, 375/226, 326, 356, 358, 371, 373; 370/249, 370/508, 516, 524
See application file for complete search history.

(56) References Cited

U.S. PATENT DOCUMENTS

| 5,740,210 A | * | 4/1998 | Rokugawa | .................. 375/362 |
| 2002/0110212 A1 | * | 8/2002 | Lysdal et al. | ............... 375/371 |
| 2003/0206606 A1 | * | 11/2003 | Herb et al. | .................. 375/373 |

FOREIGN PATENT DOCUMENTS

EP 0 642 238 A2 3/1995

OTHER PUBLICATIONS

Alexander P et al: "Troposcatter link characterization for network synchronization applications" NTC '77 Conference Record, Los Angeles, CA, USA, Dec. 5-7, 1977., pp. 38:4/1-5, XP002219998 1977, New York, NY, USA, IEEE, USA.

* cited by examiner

*Primary Examiner*—Khai Tran
*Assistant Examiner*—Aslan Ettehadieh
(74) *Attorney, Agent, or Firm*—Sughrue Mion, PLLC

(57) ABSTRACT

The invention relates to a method of phase controlling a data signal transmitted from a data source to a data sink using a counter clock approach, wherein the phase of a data sink clock is compared with the phase of a reference signal at the data sink and the phase of a counter clock is adjusted at the data sink in dependency to said phase comparing. It relates also to a counter clock circuit arrangement and interface device for performing the method according to the invention.

2 Claims, 2 Drawing Sheets

METHOD OF PHASE CONTROLLING OF A DATA SIGNAL, COUNTER CLOCK CIRCUIT ARRANGEMENT, AND INTERFACE DEVICE

The invention is based on a priority application EP 02 360 143.8 which is hereby incorporated by reference.

FIELD OF THE INVENTION

The invention relates to a method of phase controlling of a data signal, an interface device, and a counter clock circuit arrangement.

BACKGROUND OF THE INVENTION

Methods of phase controlling of a data signal using a counter clock approach as well as corresponding counter clock circuits are in generally known in the state of the art. They are used, for example for distributing digital data signals among different, spatially separated modules, units or parts of a circuit arrangement or of different circuits. The data signal has to be sampled with the data clock for evaluating the data signal. Thereby, the data clock could be recovered from the data signal itself or a generated clock could be used in case of a known data clock. In order to provide the different modules, units or parts of a circuit arrangement with the same clock, the clock is usually transmitted between the modules, units or parts of a circuit arrangement.

In general a data signal is transmitted from a first unit or part, which can in generally considered as a data source, to a second unit or part, which can correspondingly considered as a data sink. Using a counter clock approach, in particular the clock is transmitted in a counter propagating direction regarding the propagation of the data signal. Thereby, a clock, which is also called a main clock or master clock, is generated inside or fed to the data sink and from there it is transmitted to the data source as the counter propagating clock.

A counter clock circuit arrangement of the state of the art comprises a first latch at the data source unit and a second latch at the data sink unit. The data sink generates or receives a main clock. At the data sink, the main clock is split into a data sink clock and a counter propagated clock, which is transmitted to the data source. The processing in the data source is controlled with the counter propagated clock. In more detail, the data signal is synchronised with the counter propagated clock at the data source and with the data sink clock or main clock, respectively, at the data sink using the first and second latch. Due the periodic character of the clock several discrete values are allowed. However, variations of the data/clock link between data source and data sink and/or circuit propagation delays exceeding the clock phase margin of the data sink latch will cause bit errors. In particular, at high clock rates it is difficult to stabilise the timing.

Throughout this specification including in the claims, the expression "data sink clock" denotes a clock, which is fed to the data sink or generated in the data sink and is provided for controlling the timing of certain functions at the data sink, such as duration of signal elements or a sampling rate or for synchronisation of a transmission facility.

Throughout this specification including the claims, the expression "counter propagating clock" or "counter clock" denotes a clock, which is provided for controlling the timing of certain function at the data source, such as duration of signal elements or a sampling rote or for synchronisation of a transmission facility, and is transmitted from the data sink.

Another approach in the prior art is a counter clock circuit with a First-In-First-Out (FIFO) memory. In comparison with the above mentioned circuit of the prior art a FIFO memory is provided at the data sink and a co-propagating clock is transmitted from the data source to the data sink. The co-propagating clock is realised as the counter clock, which is back-coupled from the data source to the data sink. The data are written in the FIFO under control of the co-propagating clock, which is phase matched with the data of the data source and has an arbitrary phase with respect to the main clock. The data are red out of the FIFO using the data sink clock or main clock, respectively, thereby ensuring a proper clock data phase at the input register of the data sink. Phase fluctuations or transmitting differences of the signals are compensated by temporarily writing in more data than reading out or reading out more date than writing in. Thus, the FIFO memory is used to compensate temporary propagation variations of the data/clock link between data source and data sink and/or circuit propagation delays.

However, the depth of the FIFO memory limits the correction abilities of the circuit. Small fluctuations or short-term variations could be tackled in this way. In contrary, a constant or a long-term potential phase drift of the circuit even by small deviations would, sooner or later, certainly leads to an exceeding of the memory limits and thus to bit errors.

SUMMARY OF THE INVENTION

It is an object of the invention to provide a method, an interface device and a counter clock circuit arrangement, which avoid the above mentioned problems of the state of the art.

These objects are achieved by a method of phase controlling a data signal according to claim 1, an interface device according to claim 1 and a counter clock circuit arrangement according to claim 2.

A method of phase controlling of a data signal according to the invention comprises the steps of:
transmitting a data signal from a data source to a data sink,
transmitting a counter clock from the data sink to the data source,
synchronising the data signal with the counter clock at the data source,
synchronising the data signal with a data sink clock at the data sink, wherein the method further comprises the steps of:
comparing the phase of the data sink clock with the phase of a reference signal at the data sink,
adjusting the phase of the counter clock at the data sink in dependency on the phase comparison of the data sink clock and the reference signal.

An Interface device for phase controlling of a data signal according to the invention, wherein a counter clock approach is applied and the data signal is transmitted from a data source to the interface device, comprises a data signal input, a data signal output, a clock input, a clock output and a latch having an latch input connected with the data signal input, an latch output connected with the data signal output and a latch clock input connected with the interface clock input of interface device, wherein the interface device further comprises a phase shifter with an input, an output, and a control input, the phase shifter input is connected with the interface clock input, the phase shifter output is connected with the interface clock output, and means for comparing the phase of a data sink clock, which is applied to the clock input of the latch, with the phase of a reference signal, wherein the means control the phase shifter in dependency on the phase comparison via the phase shifter control input.

A counter clock circuit arrangement according to the invention, which controls the phase of a data signal transmitted from a data source to a data sink, comprises a first latch at the data source, a second latch at the data sink, a data signal link and counter clock link, wherein the first latch has a data signal input for an incoming data signal with respect the data source, a data signal output for transmitting the data signal from the data source to the data sink, and a clock input connected with a counter clock, the second latch has a data signal input for receiving the data signal from the data source, a data signal output, and a clock input connected with a data sink clock, the data signal is transmitted from the data source to the data sink over the data signal link, a main clock is split into the data sink clock and the counter clock at the data sink, and the counter clock is transmitted over the counter clock link from the data sink to the data source, and wherein the circuit arrangement further comprises means for comparing the phase of the data sink clock with the phase of a reference signal at the data sink and a phase shifter for phase shifting the counter clock, and wherein the means for comparing control the phase shifter in dependency on the phase comparison of the data sink clock.

A basic idea of the present invention is the comparison of the phase of the data sink clock with respect to the phase a reference signal. The comparison takes place at the data sink or at the interface device, respectively. The reference signal is subjected to the counter clock circuit arrangement. That means, the phase of the of the reference signal is, for example, dependent on propagation and processing delays at the data source and propagation delays of the counter clock link and the reference signal link. This phase can vary due to sample tolerances in serial production and due ageing or to time variant ambient conditions. In a frequency agile system the main clock frequency and correspondingly the bitrate can vary which also implies changes of the phase relation. With other words: The reference signal, in particular the phase of the reference signal, depends on the processing and transmission conditions of the counter clock circuit arrangement and a change of these conditions is indicated by a change of the phase of the reference signal. In accordance with the invention a change of the conditions is detected by phase comparison of the reference signal with respect to the phase of the data sink clock. A phase shifter is used to adopt the counter clock phase in such a way that the phase relation between reference signal and data sink clock is stabilised. As a consequence the phase relation between data input and data sink clock is stabilised and error free operation of the data sink latch is maintained. Phase fluctuations or transmitting differences of the signals are compensated in an active manner by adapting the counter clock phase in contrast to the passive manner of the FIFO solution. A constant or a long-term potential phase drift of the counter clock circuit—which even by small deviations sooner or later certainly leads to an exceeding of the memory limits of the FIFO solution—as a matter of fact do not arise in practise any longer, because of the active adapting of the counter clock phase to such phase variations.

In an advantageous manner any initial adjustment of phase to tackle the sample variations as well as in service corrections to compensate time variant effects can be avoided. In contrast to the FIFO solution which suffers from the limited depth of the data memory it is possible to shift the phase of the clock signal over an infinite range. Due to the periodic character of a clock any required phase shift can be realised free of glitches by mapping to just one clock period.

In a preferred embodiment of the invention the counter clock is back-coupled from the data source to the data sink as a co-propagating clock which is used as the reference signal. A clock-clock phase detector is used as a phase comparator for comparing the phase of the co-propagating clock with the phase of the data sink clock. Thus, a delay lock loop established via the counter clock line and the co-propagating clock line, is applied to stabilise the phase of the data signal at the data sink. The delay lock loop directly controls the phase of the counter clock and co-propagating clock respectively, and not the phase of the data signal. Therefore, a precise relative delay matching between co-propagating clock and data signal is required for a bit error free registration at the data sink or the interface device respectively.

In another preferred embodiment of the invention the data signal itself at the data sink is used as the reference signal. A data-clock phase detector is used as the phase comparator for comparing the phase of the data signal with the phase of the data sink clock. Again a delay lock loop is establish, namely via the data signal link and the counter clock link. The delay lock loop now directly controls the relevant signals at the input latch of the data sink or the interface device respectively. The co-propagating clock link and the need for relative matching with the data link is avoided.

Various other benefits, embodiments and modifications of the invention will be understood from a consideration of the following detailed description taken in conjunction with the accompanying drawing.

Other object and advantages of the present invention may be ascertained from a reading of the specification and appended claims in conjunction with accompanying drawing wherein:

DETAILED DESCRIPTION OF THE INVENTION

Figure 1:
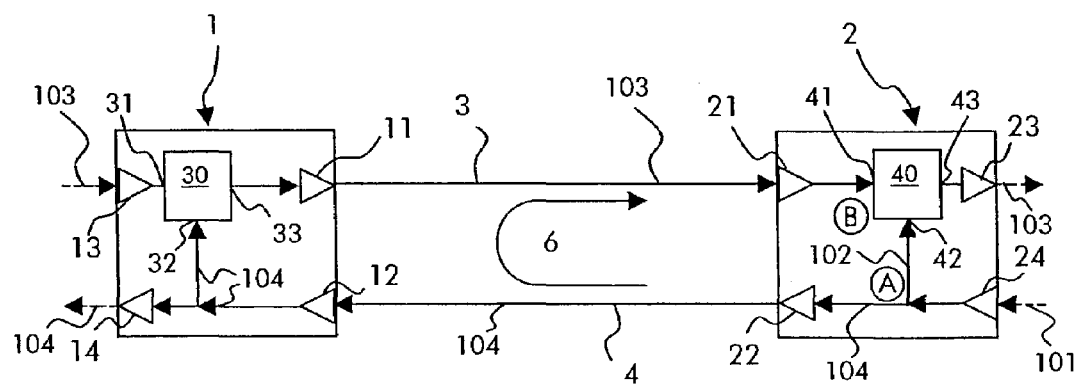
FIG. 1 shows a first counter clock circuit arrangement of the state of the art.

FIG. 1 shows a first counter clock circuit arrangement of the state of the art.

The general architecture of a counter clock circuit arrangement comprises a data source unit 1 and a data sink unit 2 connected over a data link 3 and a clock link 4. The data source unit 1 and data sink unit 2 could also be considered as interface devices of a data source 1 or a data sink 2 respectively. Data 103 propagates from the data source 1 to the data sink 2 via the data link 3, i.e. from the left side to the right side with respect to FIG. 1. A clock 104 propagates in counter direction from the data sink 2 to the data source 1 via the clock link 4. Therefore, the clock is also called counter clock 104 or counter propagating clock 104.

The data source 1 has a data input 13, a data output 11, clock output 14 and a clock input 12. The data sink 2 has a data input 21, a data output 23, clock output 22 and a clock input 24. The data link 3 connects the data output 11 of the data source 1 and the data input 21 of the data sink 2. The clock link 4 connects the clock output 22 of the data sink 2 and the clock input 12 of the data source 1. The data link 3 and clock link 4 are preferably wired connection using optical and/or electrical transmission lines.

The data source 1 comprises a first latch 30 and the data sink 2 comprises a second latch 40. A latch is in general a simple flip-flop circuit having at least one feedback loop. With respect to its function a latch is a level controlled memory function. Latches are often used to build more sophisticated flip flop circuits, therefore a latch is sometimes also called a basic flip flop. The latch 30, 40 shown in FIG. 1 is in particular a delay latch (D-latch) or a delay flip flop (D-flip-flop). The latch 30 comprises a data input 31, a clock input 32 and a data output 33. The clock input 32 is connected with the data source clock input 12, the data input 31 is connected with data source data input 13 and the data output 33 is connected with the data source data output 11. The latch 40 provided at the data sink 2 is correspondingly connected with its inputs and outputs 41, 42, 43 with inputs and outputs 21, 24, 23 of the data sink 2.

The data source unit 1 and data sink unit 2 shown in FIG. 1 are structural the same. The data source unit 1 could be connected with a further data source unit (not shown) over the data input 13 and the clock output 14, wherein the data source unit 1 would represent a data sink unit regarding this further data source unit. By this way, several data sink units/data source units could be connected to each other.

The circuit arrangement functions as follow: The latches 30, 40 are used for synchronising the data signal 103 with a clock 104, 102 applied to the latch 30, 40. A main clock 101 or master clock 101 is fed to the clock input 24 of the data sink 2. The main clock 101 is split into a data sink clock 102 and a counter clock 104 at point A of FIG. 1. A loop 6 is established between data sink 2 and data source 1 comprising the latches 30 and 40 and the data link 3 and clock link 4. In more detail, a race starts at point A, where the main clock 101 is split to feed the data source latch 30 and the data sink latch 40, and ends at point B, where the clock 102 directly coming from point A and the data signal 103 synchronised with the counter clock 104 in the latch 30, are joined again at the data sink input latch 40. Due the periodic character of the clock several discrete values are allowed for the clock phase. The circuit is not designated for responding to variations of link and/or circuits propagation delays. Bit errors occur at the latch 40, if the delay variation exceeds the clock phase margin of latch 40.

Figure 2:
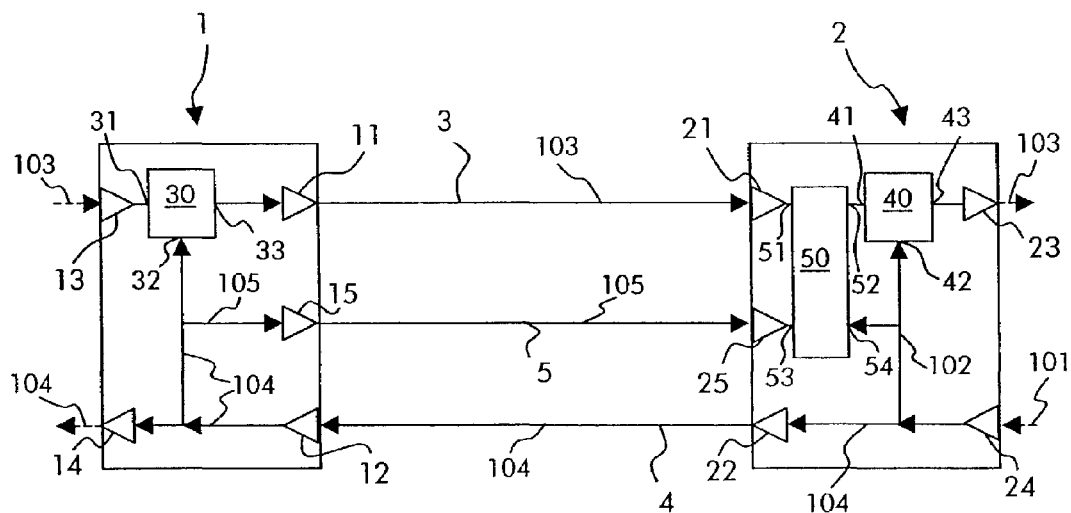
FIG. 2 shows a second counter clock circuit arrangement of the state of the art having a FIFO memory.

FIG. 2 shows a second counter clock circuit arrangement of the state of art, wherein identical reference numbers denotes identical parts or elements of the circuit. This circuit differs from the circuit shown in FIG. 1 in a First-In-First-Out (FIFO) memory 50 provided at the data sink unit 2 and co-propagating clock link 5 connecting a co-propagating clock output 15 of the data source 1 with a co-propagating clock input 25 of the data sink 2.

A FIFO memory is suitable as a buffer memory of a data transmission, if a data source and a data sink are operated with different clock phases or rates and the memory capacity is not exceeded. The FIFO 50 has a data input 51, a data output 52, a first clock input 53 for a data input clock and a second clock input 54 for a data output clock. Data are written in the FIFO 50 under control of a data input clock and read under the control of a data output clock. The data input 51 of the FIFO 50 is connected with the data sink data input 21 and the data output 52 of the FIFO 50 is connected with the data input 41 of the latch 40. The co-propagating clock 105—with respect to the data propagation transmitted from the data source 1 to the data sink 2—is fed to the clock input 53 and is used for controlling the writing of the data into the FIFO 50. The co-propagating clock 105 is established as the counter clock 104, which is back-coupled from the data source 1 to the data sink 2. The data sink clock 102 of the data sink 2 is used for reading out data from the FIFO 50, which is fed to the FIFO 50 via the second clock input 54.

Figure 3:
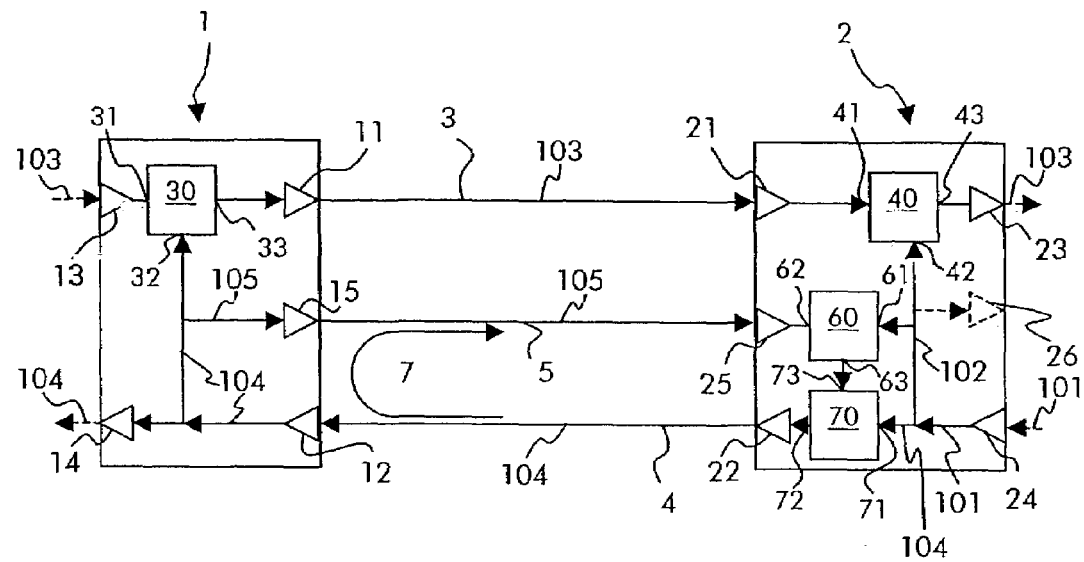
FIG. 3: shows a first embodiment of the invention with delay locked loop based on a clock-clock phase detector.

The circuit arrangement compensates for clock phase fluctuations within the range of the memory capacity of the FIFO 50, but it needs apart from the FIFO 50 a second clock link 5 as well co-propagating input 25 and output 15. In particular, a carefully delay matching between the data 103 transmitted via the data link 2 and the co-propagating clock 105 of the second clock link 5 is essential FIG. 3 shows a first embodiment of a circuit arrangement according to the present invention. Identical reference numbers denotes identical parts or elements of the circuit according FIGS. 1 and 2. The circuit arrangement comprises in general means 60 for comparing the phase of the data sink clock 102 with a reference signal 105 transmitted from the data source 1 to the data sink 2 and means 70 for controlling the phase of the counter clock 104 in dependency of the comparing, wherein these means 60, 70 are located at the data sink 2. That is, phase comparison as well as phase controlling is effected at the data sink 2. A basic idea of the present invention is to establish a Delay Locked Loop (DLL) 7 for the data sink clock 102/counter clock 104 within the circuit arrangement by using the reference signal 105 and the above-mentioned means 60, 70 and controlling the counter clock phase accordingly.

The term "reference signal" is sometimes used for a certain signal which has high stability and accuracy, i.e. which is maintained unchanged for calibrating other signals. In this application and throughout the claims the term "reference signal" is used in a broader meaning and denotes a signal which may change and is used in general for signal comparison. In particular, the reference signal indicates a change in the transmission conditions for a signal transferred from the data source to the data sink.

In more detail, the means for comparing the data sink clock phase is a clock-clock phase comparator 60 and the means for controlling the counter clock is a phase shifter 70. The reference signal is a co-propagating clock 105, which is transmitted over a link 5 from the data source 1 to the data sink 2. Thus, the co-propagating clock 105 is used for the phase comparison.

The clock-clock phase comparator 60 with its first input 61 is connected with the data sink clock 102 of the data sink 2 and with its second input 62 with the co-propagating clock input 25 of the data sink 2. Further, an output 63 of the phase comparator 63 is connected with a control input 73 of a phase shifter 70. The phase shifter 70 has an input 71 and output 72. The input 71 is connected the counter clock 104 of the data sink 2 and the output 72 with the counter clock output 22 of the data sink 2. An incoming clock 101 is split into the data sink clock 102 and the counter clock 104 at the data sink 2.

The phase comparator 60 is realised as a clock-clock phase detector (CCPD). Common phase detectors can be utilised, for example simple phase detectors build up of D flip-flops or more sophisticated phase detectors based on up/down counter or in form of integrated circuits. Common phase shifter circuitry's, for example an all-pass active network with operational amplifier or an all-pass filter, known by persons skilled in the art can be used as phase shifters 70. In particular a digital realisation of the phase shifter allows to achieve virtually infinite phase range by mapping of all phases to a single clock period.

According to the invention the DLL 7 is applied to stabilise the phase at the data input latch 40 of the data sink 2. The phase of the data sink clock 102 is compared with the phase of the co-propagating clock 105 by the clock-clock phase detector 60 and its output signal is fed to the voltage controlled phase shifter 70. The latter adjusts the phase of the counter propagating clock 104 to maintain a proper data-clock-phase relation at the data input latch 40. The DLL 7 directly only controls the phase of the co-propagating clock 105 and counter clock 104 respectively, and not the phase of data signal 103. Therefore, a precise relative delay matching between co-propagating clock 105 and data signal 103 is required. Within its dynamic range the DLL 7 accommodates to arbitrary, in particular also initial loop delays and compensates for delay variations in an active manner by adapting the counter clock phase. The loop also compensates phase variations due to changes of the main clock rate if the whole system is operated synchronous, but frequency agile.

The data sink unit 2 of FIG. 3 represents an interface device 2 according to the invention, which comprises a latch 40, a clock-clock phase comparator 60, and a phase shifter 70 as well as corresponding inputs and outputs 21, 22, 23, 24, 25 for transmitting/receiving data signal 103, clock 101 and counter clock 104 respectively, and co-propagating clock 105 as shown in FIG. 3. The data sink unit 2 of the invention and interface device 2 of the invention respectively, could be connected in series with a further (not shown) data sink unit 2 via the in-/outputs 23, 24. A further clock output 26, shown in a dashed line in FIG. 3, is provided for establishing the co-propagating clock link. With respect to the direction of a data stream and to the position of an interface device 2 in a sequence of interface devices, the interface device 2 could be considered as a data sink as well as a data source.

Figure 4:
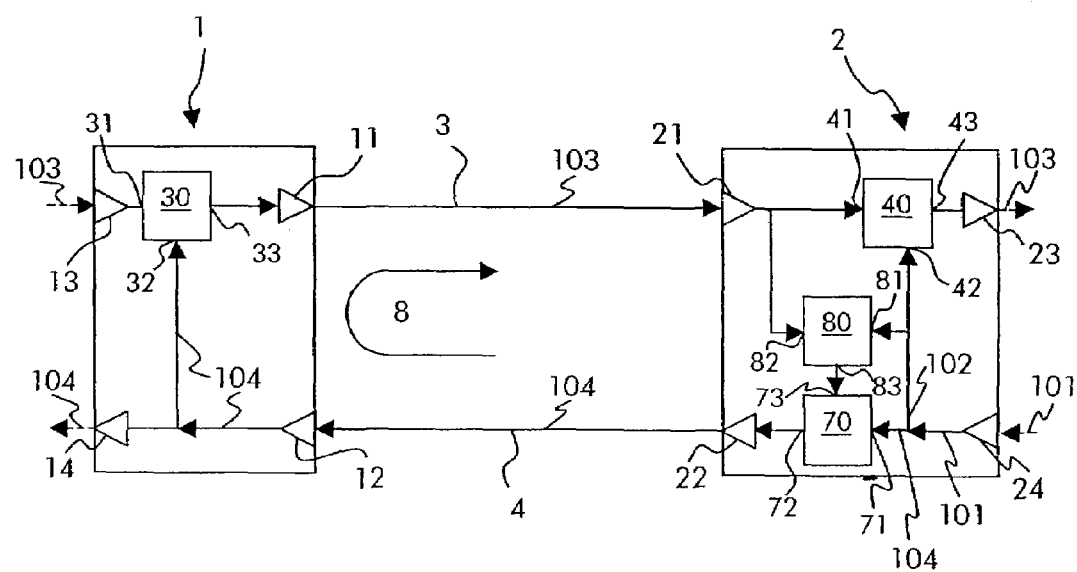
FIG. 4: shows a second more advantageous embodiment of the invention with delay locked loop based on a clock-data phase detector.

FIG. 4 shows a second embodiment of a circuit arrangement according to the present invention, wherein identical reference numbers denotes identical parts or elements of the circuit.

A basic idea of this second embodiment of the invention is to establish a direct control of the relevant signals, namely the counter clock 104 and the data signal 103. This is achieved by using the data signal 103 itself as reference signal for the phase comparison with the data sink clock 102. Thus, the data signal 103 is used for controlling the counter clock 104. A Delay Lock Loop (DLL) 8 is established which now directly controls data signal 103 and counter clock 104 at the data sink 2.

Thus, in comparison with the first embodiment as shown in FIG. 3, the circuit arrangement does not need a co-propagating clock 105 or co-propagating clock link 5, respectively. Furthermore, a clock-data phase detector (CDPD) 80 comparing the phase of the data signal with the data sink clock replaces the clock-clock phase detector 60. A first input 81 of the CDPD 80 is connected with the data sink clock 102 and a second input 82 of the CDPD 80 is connected with the data signal input 21 of the data sink 2. A output 83 of the CDPD 80 is connected with the control input 73 of the phase shifter 70 for controlling the phase of the counter clock in dependency of the phase relation of data signal 103 and data sink clock 102.

Clock data phase detectors (CDPD) are known by persons skilled in the art. A clock data phase detector is for example published in Journal of Lightwave Technology, vol. LT-3., No 6, December 1985, page 1312–1314, "a self correcting clock recovery circuit" by Charles R. Hogge and in the U.S. Pat. No. 4,535,459, which are herewith incorporated by reference.

Advantages of the second embodiment are that a co-propagating clock input 15 and output 25, co-propagating clock link 5 and the delay matching with the clock is no longer needed. The DLL 8 is optimally exploited.

The data sink unit 2 of FIG. 4 also represents an interface device 2 according to the invention, which comprises a latch 40, a clock-clock phase comparator 80, and a phase shifter 70 as well as corresponding inputs and outputs 21, 22, 23, 24 for transmitting/receiving the data signal 103 and the clock 101 and counter clock 104 respectively, as shown in FIG. 4. The interface device 2 according to the invention could be connected in series with further (not shown) data sink units 2 via the in-/outputs 23, 24. With respect to the direction of a data stream and to the position of an interface device 2 in a sequence of interface devices, the interface device 2 could be considered as a data sink as well as a data source.

In addition, a (not shown) loop filter can be provided between the clock-clock phase detector 60 (CCPD) of FIG. 3 and the phase shifter 70 or the clock-data phase detector 80 (CDPD) of FIG. 4 and the phase shifter 70. The loop filter serves for definition of the control loop frequency characteristics like gain, bandwidth and peaking as well as the transient behaviour like time constant, damping, overshoot. As loop filter all kind of integrating, differentiating, proportional loop filters or combination thereof can be used.

The invention claimed is:

1. An interface device for phase controlling a data signal wherein the data signal is transmitted from a data source to said interface device, comprising:
    a data signal input;
    a data signal output;
    a clock input;
    a clock output;
    a latch having a latch input connected with the data signal input, a latch output connected with the data signal output, and a latch clock input connected with the interface clock input;
    a phase shifter having an input, an output, and a control input, wherein said phase shifter input is connected with the interface clock input, and said phase shifter output is connected with the interface clock output; and
    means for comparing a phase of a data sink clock, which is applied to said clock input of said latch, with a phase of a reference signal, wherein said means for comparing controls said phase shifter via the phase shifter control input in dependency on said phase comparison;
    wherein said data signal is used as said reference signal and said means for comparing is a data-clock phase detector having a first input connected with said data signal input, a second input connected with said data sink clock of said interface device, and an output connected with the control input of said phase shifter.

2. A counter clock circuit arrangement for phase controlling a data signal transmitted from a data source to a data sink, comprising:
    a first latch at the data source;
    a second latch at the data sink;
    a data signal link; and
    a counter clock link;

wherein the first latch has a data signal input for an incoming data signal with respect to the data source, a data signal output for transmitting the data signal from the data source to the data sink, and a clock input connected with a counter clock;

the second latch has a data signal input for receiving said data signal from the data source, a data signal output, and a clock input connected with a data sink clock;

said data signal is transmitted from the data source to the data sink over said data signal link;

a clock is split into said data sink clock and said counter clock at the data sink; and said counter clock is transmitted over said counter clock link from the data sink to the data source;

wherein the circuit arrangement further comprises:

means for comparing a phase of said data sink clock with a phase of a reference signal at the data sink; and a phase shifter for phase shifting said counter clock;

wherein said means for comparing controls said phase shifter in dependency on said phase comparison; and wherein said data signal is used as said reference signal and said means for comparing is a data-clock phase detector having a first input connected with the data sink clock, a second input connected with the data signal, and an output connected with a control input of said phase shifter.

* * * * *